US012231373B2

(12) United States Patent
Wong et al.

(10) Patent No.: US 12,231,373 B2
(45) Date of Patent: *Feb. 18, 2025

(54) TELECOMMUNICATIONS APPARATUS AND METHODS

(71) Applicant: Sony Group Corporation, Tokyo (JP)

(72) Inventors: Shin Horng Wong, Basingstoke (GB); Martin Warwick Beale, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,419

(22) Filed: Apr. 14, 2023

(65) Prior Publication Data
US 2023/0254099 A1 Aug. 10, 2023

Related U.S. Application Data

(63) Continuation of application No. 17/164,180, filed on Feb. 1, 2021, now Pat. No. 11,632,222, which is a (Continued)

(30) Foreign Application Priority Data

Sep. 29, 2016 (EP) .................................. 16191540

(51) Int. Cl.
H04L 5/08 (2006.01)
H04L 5/00 (2006.01)

(52) U.S. Cl.
CPC .......... H04L 5/0098 (2013.01); H04L 5/0041 (2013.01); H04L 5/0042 (2013.01); H04L 5/0092 (2013.01); H04L 5/08 (2013.01)

(58) Field of Classification Search
CPC ... H04L 5/0041; H04L 5/0042; H04L 5/0092; H04L 5/08
(Continued)

(56) References Cited

U.S. PATENT DOCUMENTS 6,216,265 B1* 4/2001 Roop ..................... H04N 7/088
348/E5.103
9,668,223 B2* 5/2017 Abdelmonem ....... H04W 24/08
(Continued)

FOREIGN PATENT DOCUMENTS

| CN | 102550108 A | 7/2012 |
| CN | 103327615 A | 9/2013 |
| WO | 2014/154093 A1 | 10/2014 |

OTHER PUBLICATIONS

Ericsson, "New WI proposal on Further Enhanced MTC", 3GPP TSG RAN Meeting No. 72 RP-161321 revision of RP-161319 Busan, Korea, Jun. 13-16, 2016, 7 pages.
(Continued)

Primary Examiner — Dang T Ton
(74) Attorney, Agent, or Firm — XSENSUS LLP

(57) ABSTRACT

A method of conveying an allocation of radio resources on a radio channel for communicating data between a base station and a terminal device in a wireless telecommunications system, wherein the radio channel spans a channel frequency bandwidth divided into frequency resource units which may be selectively allocated for communicating data between the base station and the terminal device, and wherein the method comprises, at the base station, selecting a combination of resource units for communicating the data between the base station and the terminal device from among a predefined set of allowable combinations of resource units, wherein the allowable combinations of resource units include non-contiguous combinations of resource units and wherein the number of allowable combinations of resource units is smaller than the total number of combinations of resource units, and conveying, to the terminal device, an indication of the selected combination of resource units.

20 Claims, 5 Drawing Sheets

Related U.S. Application Data continuation of application No. 16/334,368, filed as application No. PCT/EP2017/073172 on Sep. 14, 2017, now Pat. No. 10,911,209.

(58) Field of Classification Search
USPC .................................. 370/329, 401, 402, 403
See application file for complete search history.

(56) References Cited

U.S. PATENT DOCUMENTS

| | | | |
|---|---|---|---|
| 10,595,307 | B2 | 3/2020 | Harrison |
| 10,911,209 | B2* | 2/2021 | Wong .................... H04L 5/0042 |
| 11,632,222 | B2* | 4/2023 | Wong ........................ H04L 5/08 |
| | | | 370/329 |
| 2003/0152046 | A1 | 8/2003 | Kawai |
| 2014/0036810 | A1 | 2/2014 | Harrison et al. |
| 2016/0249363 | A1 | 8/2016 | Kobayashi et al. |

OTHER PUBLICATIONS

3GPP, "Technical Specification Group Radio Access Network; Evolved Universal Terrestrial Radio Access (E-UTRA); Multiplexing and channel coding", Release 13, 3GPP TS 36.212 V13.2.0, Jun. 2016, pp. 1-140.

Holma et al., "LTE for UMTS OFDMA and SC-FDMA Based Radio Access", Wiley 2009, System Architecture Based on 3GPP SAE, 11 pages.

Vodafone et al., "New work item proposal: Enhancements of NB-IoT", 3GPP TSG RAN Meeting No. 72 RP-161324, Busan, Korea, Jun. 13-16, 2016, 8 pages.

3GPP, "Technical Specification Group Services and System Aspects; Service requirements for Machine-Type Communications (MTC)", Stage 1, Release 12, 3GPP TS 22.368 V12.4.0, Jun. 2014, pp. 1-22.

Panasonic, "Resource allocation of PDSCH for Rel.13 MTC", 3GPP TSG RAN WG1 Meeting No. 82bis R1-155341, Malmö Sweden, Oct. 5-9, 2015, pp. 1-2.

Panasonic, "Mpdcch allocation in narrowband", 3GPP TSG RAN WG1 Meeting No. 83 R1-156939, Anaheim, USA, Nov. 15-22, 2015, pp. 1-4.

Sony, "Report on informal email discussion [eMTC-5] on remaining PDSCH issues for Rel-13 eMTC", 3GPP TSG RAN WG1 Meeting No. 83 R1-15xxxx_Draft2, Anaheim USA, Nov. 15-22, 2015, pp. 1-28.

LG Electronics, "Summary of email discussion [82b-03] on DCI contents for eMTC", 3GPP TSG RAN WG1 Meeting No. 83 R1-157503, Anaheim USA, Nov. 15-22, 2015, pp. 1-28.

International Search Report mailed on Nov. 17, 2017 for PCT/EP2017/073172 filed on Sep. 14, 2017, 11 pages.

* cited by examiner

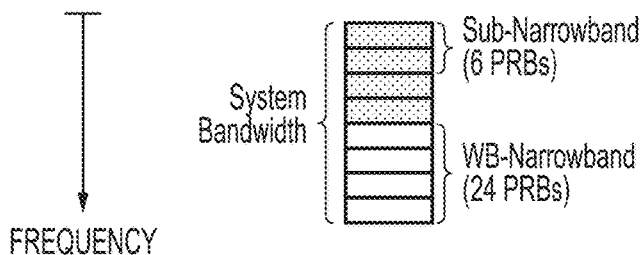
FIG. 3
| System Bandwidth (PRB) | eMTC (6 PRB) | fe-MTC (24 PRB) |
|---|---|---|
| 100 | 4 | 2 |
| 75 | 4 | 2 |
| 50 | 3 | 1 |
| 25 | 2 | 0 |
FIG. 4
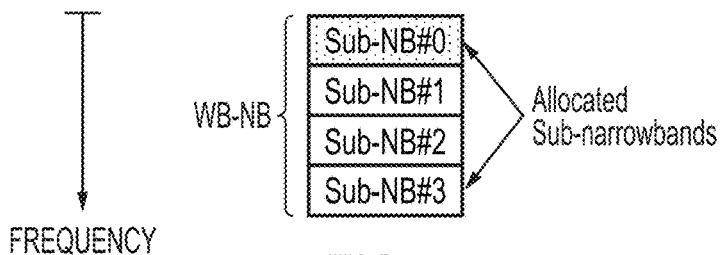
FIG. 5
FIG. 6
| Number of Allocated Sub-NB | Configuration 1 | Configuration 2 |
|---|---|---|
| 1 ( Bits "00" ) | Sub-NB#0 | Sub-NB#3 |
| 2 ( Bits "01" ) | Sub-NB#0 & Sub-NB#3 | Sub-NB#1 & Sub-NB#3 |
| 3 ( Bits "10" ) | Sub-NB#0, Sub-NB#1, Sub-NB#3 | Sub-NB#0, Sub-NB#2, Sub-NB#3 |
| 4 ( Bits "11" ) | All sub-narrowbands | All sub-narrowbands |
FIG. 7

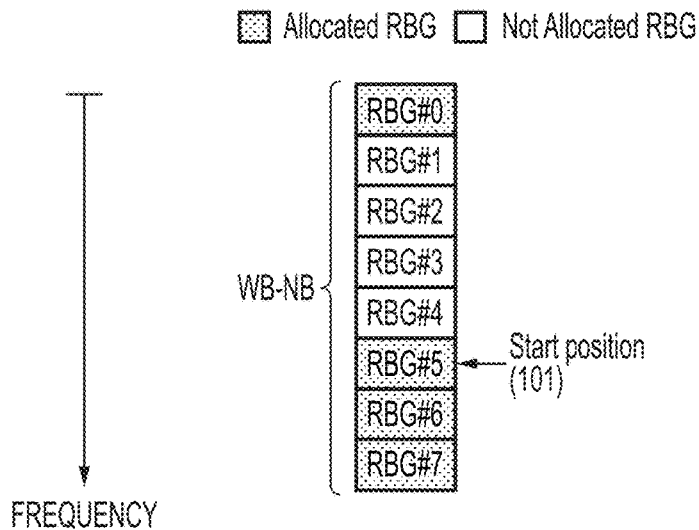
FIG. 8
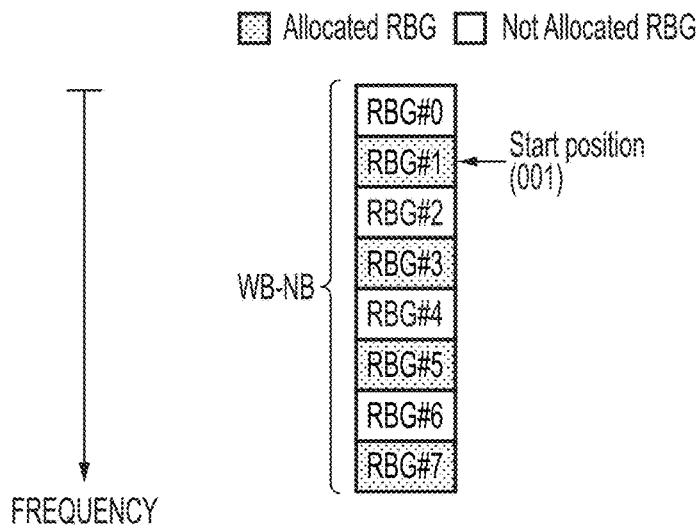
FIG. 9
| Number of RBGs indicated | Active sub-narrowbands indicated | Allocation |
|---|---|---|
| 1 | {0} | Lowest three PRBs in sub-NB 0 |
| 2 | {0} | All PRBs in sub-NB 0 |
| 2 | {0,3} | Lowest three PRBs in sub-NB 0 and highest three PRBs in sub-NB 3 (maximises frequency diversity) |
| 3 | {0,1} | All PRBs in sub-NB 0 and highest three PRBs in sub-NB 1 (maximises frequency diversity) |
| 3 | {0,1,2} | Lowest three PRBs in sub-NB 0, 1 and 2 |
| Etc. | Etc. | Etc. |
FIG. 10

TELECOMMUNICATIONS APPARATUS AND METHODS

CROSS-REFERENCE TO RELATED APPLICATIONS

The present application is a continuation of U.S. application Ser. No. 17/164,180, filed Feb. 1, 2021, which is a continuation of U.S. application Ser. No. 16/334,368, filed Mar. 19, 2019 (now U.S. Pat. No. 10,911,209, issued Feb. 2, 2021), which is based on PCT filing PCT/EP2017/073172, filed Sep. 14, 2017, which claims priority to EP 16191540.0, filed Sep. 29, 2016, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth and subsequent generation mobile telecommunication systems, such as those based on the 3GPP defined UMTS and Long Term Evolution (LTE) architectures, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage areas for these networks is expected to increase rapidly.

The anticipated widespread deployment of third and fourth generation networks has led to the parallel development of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis.

Further information on characteristics of MTC-type devices can be found, for example, in the corresponding standards, such as ETSI TS 122 368 V12.4.0 (2014-10)/3GPP TS 22.368 version 12.4.0 Release 12 [1]. Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

A current technical area of interest to those working in the field of wireless and mobile communications is known as "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. Such devices are expected to often be low complexity and inexpensive devices requiring infrequent communication of relatively low bandwidth data.

Thus it is expected these eMTC/NB-IoT types of devices will be configured to operate on relatively narrowbandwidth carriers, for example initial proposals have suggested operating within a 1.4 MHz channel. Such a narrowband channel could in principle be supported on an independent carrier or could more likely make use of so-called virtual carrier techniques that support restricted (i.e. narrow) bandwidth channel(s) within a wider system bandwidth.

Proposals for Release 14 of the 3GPP specifications include enhancing the operation of eMTC/NB-IoT devices by introducing so-called eNB-IoT (enhanced NB-IoT) and fe-MTC (further enhanced MTC) [3], [4]. For simplicity the term fe-MTC may be used herein to refer to all types of such eMTC/NB-IoT devices.

One of the proposed enhancements for Release 14 is to increase the RF bandwidth of fe-MTC terminal devices, e.g. from 1.4 MHz to 5 MHz, and this enhancement is termed as wide bandwidth fe-MTC (WB-MTC). In an LTE context a 5 MHz narrowband can contain 25 PRBs (Physical Resource Blocks) but there is a preference to use an integer multiple of the 6 PRBs currently available for a 1.4 MHz channel in a Release 13 eMTC, and so the proposal is to use 24 of the 25 PRB in a 5 MHz channel. Despite the proposal to introduce wider narrowband channels for fe-MTC operation, the channels are still nonetheless relatively narrow, and so the channels may still be referred to as narrowband channels. To distinguish these newly-proposed wider narrowband channels from previously proposed narrowband channels, they may sometimes be referred to herein as widebandwidth narrowband (WB-NB) channels. In addition to an increase in bandwidth, there are also proposals for the TBS (transport block size) to increase from 1000 bits to 2984 bits for WB-MTC. These improvements would increase the use cases for WB-MTC, particularly for voice.

In 3GPP Release 13 eMTC, multiple narrowbands comprising 6 PRBs may be defined within an overall wider system bandwidth. Resource allocations for a terminal device on downlink (PDSCH) and uplink (PUSCH) can be dynamically indicated with DCI (Downlink Control Information) to indicate radio resources (e.g. identify specific resource blocks) in any of the defined narrowbands. The resource indication (DCI) firstly indicates which of the multiple narrowbands in the system bandwidth contains the PRBs to be allocated, and secondly which PRBs are allocated within the indicated narrowband [5]. The PRB allocations within a narrowband are allocated in a contiguous manner (references herein to contiguous are with respect to frequency).

Because there are 6 PRBs in a narrowband, there are 21 different contiguous resource allocations that may be used (i.e. there is one way of allocating a contiguous block of 6 PRBs, two ways of allocating a contiguous block of 5 PRBs, and so on up to six ways of allocating a single PRB). This scheme therefore requires 5 bits in DCI to identify the specific contiguous PRB allocation within a given narrowband.

The number of bits needed to identify which narrowband the allocation applies to depends on the number of narrowbands supported across the system bandwidth. For example, if in downlink the overall system bandwidth provided for narrowband operation corresponds with N PRBs (which may correspond with the full system bandwidth of a part thereof), and each narrowband comprises 6 PRB, there will be N/6 narrowbands, which require ceiling[($\log_2$(N/6)] DCI bits DCI to identify which is being allocated.

For example, consider a 10 MHz system bandwidth (50 PRBs) supporting eight different narrowbands of 6 PRB width. A resource allocation requires 3 bits to indicate the narrowband in which the allocation is made, and 5 bits to indicate the contiguous PRB allocation within that narrowband. Thus an allocation of resources in one of eight 6 PRB narrowbands in a 10 MHz channel requires 8 bits The restriction to only contiguous PRB allocations reduces the number of bits needed to identify a resource allocation within a given narrowband (e.g. 5 bits for a 6 PRB narrowband), but it does not allow for frequency diversity. For Release 13 eMTC having only a 6 PRB narrowband means there is unlikely to be any significant benefit in allowing PRB allocations to be separated in frequency because the maximum frequency separation within the channel will be small, and the coherence bandwidth of the channel will often be greater than the bandwidth of the MTC narrowband.

However, the Inventors have recognized the proposal for wider narrowbands for fe-MTC means such channels are more likely to benefit from frequency diversity, and in view of this there is a need for methods and apparatus that can help provide frequency diversity in relatively narrow channels in an efficient manner, for example in terms of the amount of control signalling.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 3 schematically represents a system bandwidth divided into two narrowbands which are each notionally sub-divided into four sub-narrowbands in accordance with certain embodiments of the present disclosure;

FIG. 4 is a table schematically indicating the number of data bits for identifying one of a number of narrowbands spanning a system bandwidth for different sizes of narrowband and system bandwidth;

FIG. 5 schematically represents a narrowband channel notionally sub-divided into four sub-narrowbands in accordance with certain embodiments of the present disclosure;

FIG. 6 schematically represents resource blocks in a narrowband channel notionally sub-divided into four sub-narrowbands in accordance with certain embodiments of the present disclosure;

FIG. 7 schematically represents a lookup table for use in accordance with certain embodiments of the present disclosure;

FIGS. 8 and 9 schematically represent allocations of radio resources in a narrowband channel in accordance with certain embodiments of the present disclosure;

FIG. 10 schematically represents a lookup table for use in accordance with certain embodiments of the present disclosure.

DETAILED DESCRIPTION OF THE EMBODIMENTS

Figure 1:
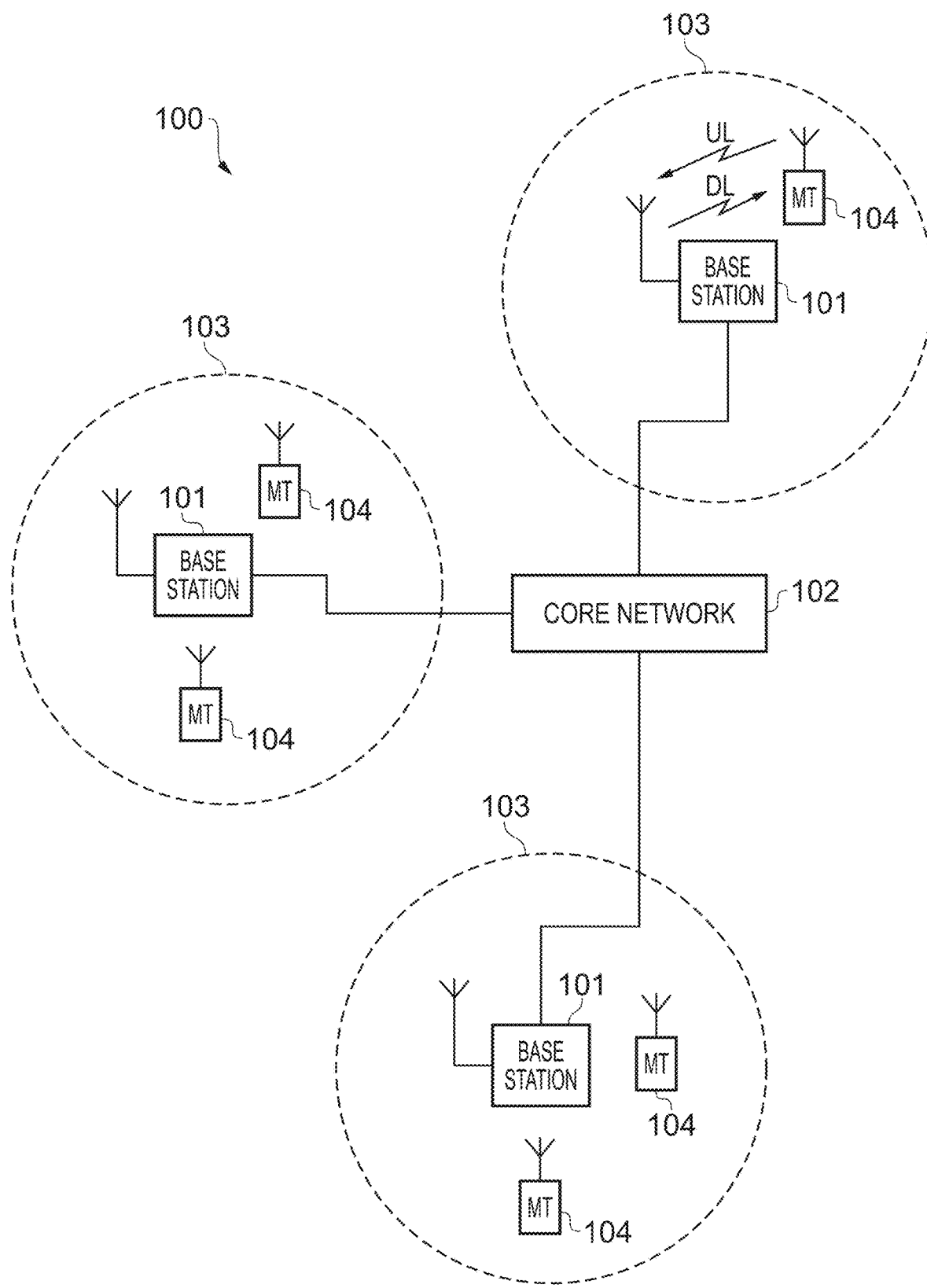
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles and which may implement embodiments of the disclosure as described herein. Various elements of FIG. 1 and their respective modes of operation are well-known and defined in the relevant standards administered by the 3GPP (RTM) body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
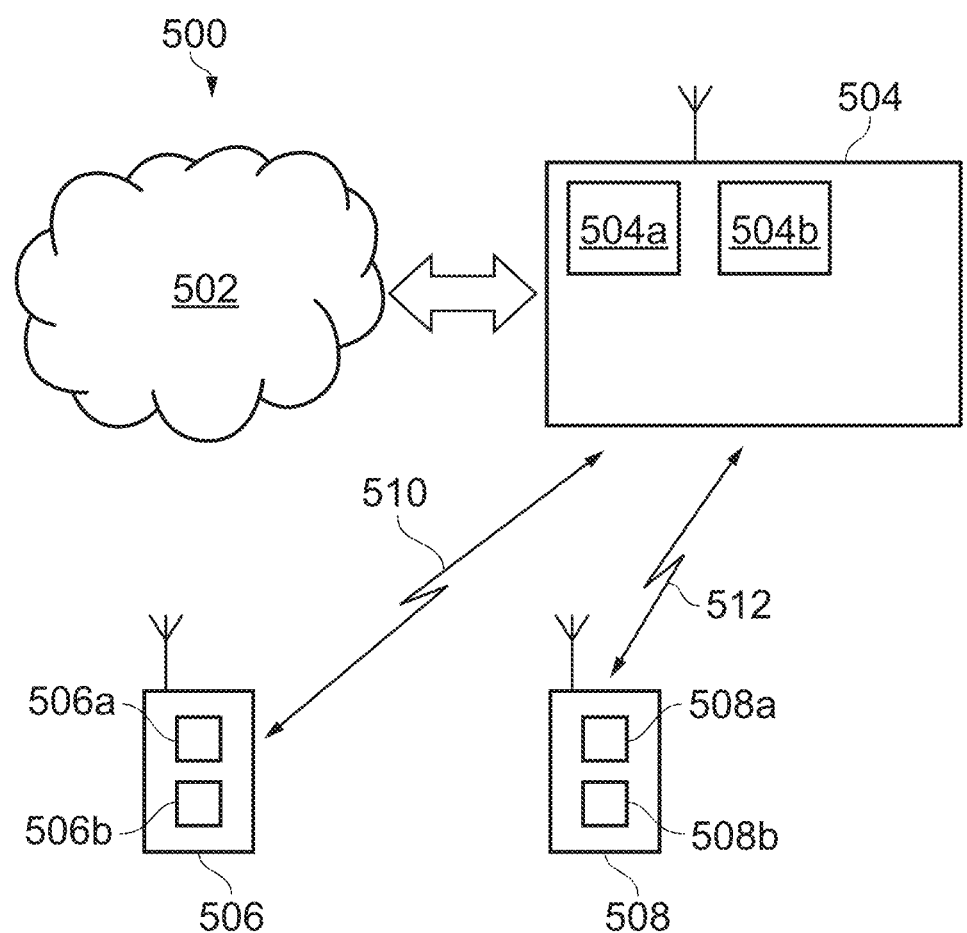
FIG. 2 schematically represents some aspects of a wireless telecommunications network configured to operate in accordance with certain embodiments of the present disclosure.

FIG. 2 schematically shows some further details of a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 2 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 2 may be broadly conventional apart from where modified to provide functionality in accordance with embodiments of the present disclosure as discussed herein.

In this example, it is assumed the first terminal device 506 is a conventional smartphone-type terminal device communicating with the base station 504 in a conventional manner. This conventional terminal device 506 comprises transceiver circuitry 506a (which may also be referred to as a transceiver/transceiver unit) for transmission and reception of wireless signals and processor circuitry 506b (which may also be referred to as a processor/processor unit) configured to control the device 506. The processor circuitry 506b may comprise circuitry which is suitably configured/programmed to provide the desired functionality using conventional programming/configuration techniques for equipment in wireless telecommunications systems. The transceiver circuitry 506a and the processor circuitry 506b are schematically shown in FIG. 2 as separate elements. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the conventional terminal device 506 will in general comprise various other elements associated with its operating functionality.

In this example, it is assumed the second terminal device 508 is a further-enhanced machine-type communication (fe-MTC) terminal device 508 adapted to support operations in an enhanced Internet of Things (IoT) context (i.e. using a wider band narrowband as discussed above) in accordance with embodiments of the present disclosure when communicating with the base stations 504. In this regard, the terminal device 508 may also be referred to as a further-enhanced reduced capability terminal device, or more simply a reduced capability device, for example reflecting that the terminal device operates on a restricted bandwidth as compared to the conventional smart phone terminal device 506. In this regard it might also be referred to as a narrowband device (albeit a narrowband device operating on a wider bandwidth (e.g. 5 MHz) than previously proposed narrowband devices). It will be appreciated this example represents one specific implementation of approaches in accordance with some embodiments of the disclosure, and in other cases, the same principles may be applied in respect of terminal devices which are not reduced capability terminal devices, but conventional smartphone terminal devices, or indeed any other form of terminal device, that may be operating in a wireless telecommunications system (e.g. the smartphone terminal device 506 may in some cases also implement functionality as described herein for the narrowband terminal device 508 in accordance with embodiments of the disclosure).

The IoT/fe-MTC terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing functionality in accordance with embodiments of the present disclosure as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 2 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 2 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 2 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler.

For example, although not shown in FIG. 2 for simplicity, the processor circuitry 504b may comprise scheduling circuitry, that is to say the processor circuitry 504b may be configured/programmed to provide the scheduling function for the base station.

Thus, the base station 504 is configured to communicate data with both the conventional smartphone terminal device 506 and the WB-NB terminal device 508 according to an embodiment of the disclosure over respective communication links 510, 512. The base station 504 is configured to communicate with the conventional terminal device 506 over the associated radio communication link 510 following the established principles of LTE-based communications and to communicate with the second terminal device 508 over the radio communication link 512 using the principles described herein.

As noted above, the Inventors have recognized the proposal for wider narrowbands for fe-MTC means such channels are more likely to benefit from frequency diversity. The Inventors have further recognized it may thus be helpful to allow PRB allocations to be distributed (i.e. non-contiguous). Known distributed allocation schemes use a bitmap to indicate which PRBs (or groups of PRBs) are allocated which requires more indication bits than that for schemes restricted to contiguous allocations. For example, in the context of a current LTE system, a 5 MHz system bandwidth might have a RBG (Resource Block Group) of 2 PRBs (resources are allocated in units of RBG). Thus for 24 PRBs spanning a 5 MHz WB-NB channel, there would be 12 RBGs requiring 12 bits for a bitmap indication, which is significantly greater than the 5 Bits currently used for contiguous allocations within a 6 PRB narrowband. However, it is preferable for resource allocation signalling (e.g. DCI) to not require a significant number of bits.

In accordance with generally conventional techniques, a scheduler at the base station is responsible for allocating radio resources for communications with the terminal devices 506, 508. In an LTE context, such as schematically represented in FIG. 2, allocations of downlink radio resources are communicated to terminal devices on a physical downlink control channel (PDCCH) which includes an indication of radio resources (i.e. PRBs) allocated to the terminal device on a physical downlink shared channel (PDSCH). Similarly, allocations of uplink radio resources are communicated to terminal devices on a physical uplink control channel (PUCCH) which includes an indication of radio resources allocated to the terminal device on a physical uplink shared channel (PUSCH). Similar resource allocation schemes, i.e. using a control channel to allocate radio resources on a data channel, may be used in other wireless telecommunications systems. Allocations are identified by indication/allocation bits addressed to the terminal device receiving the allocation according to a predefined mapping so the terminal device receiving the indication/allocation bits can derive the resource blocks it has been allocated and receive/transmit data using the derived allocation of resource blocks.

In accordance with certain embodiments of the disclosure the manner in which resource blocks may be allocated for terminal devices operating on a narrowband channel is restricted to a limited number (i.e. not all) of all the possible combinations of the resource blocks that may be allocated for terminal devices, wherein the limited number of ways in which resource blocks may be allocated includes non-contiguous allocations of PRB. This allows for frequency diversity to be introduced while requiring fewer bits to indicate a specific allocation for a terminal device than would be the case if the scheduler were free to select from all possible combinations.

There are various different ways in which the resource allocations may be restricted to reduce the number of bits needed to convey an indication of an allocation that supports frequency diversity as now explained.

In some example implementations the narrowband channel is notionally divided into a plurality of sub-narrowband channels which together span the narrowband channel.

FIG. 3 schematically represents a system bandwidth (in this case spanning 10 MHz/50 PRB) that supports two (wide-bandwidth) narrowband channels which each span a 5 MHz channel and comprise 24 PRBs. One of these narrowband channel is shown with shading (upper part of frequency space represented in FIG. 3), and one is shown without shading (lower part of frequency space represented in FIG. 3). Each 24 PRB narrowband channel is notionally divided into four adjacent 6 PRB sub-channels, as schematically indicated in FIG. 3. In some example embodiments, each 6 PRB sub-channel may correspond with a 3GPP Release-13 eMTC narrowband.

In accordance with some example implementations, a single resource allocation message may allocate resources to a terminal device in one or other of the two narrowbands (i.e. in either the upper (shaded) or lower (non-shaded) narrowband), but not both. Because the narrowbands in FIG. 3 are four times wider than previously-proposed narrowbands, a given system bandwidth supports four times fewer of these 24 PRB narrowband channels that the previously proposed 6 PRB channels. Consequently, the specific narrowband within a given system bandwidth can be indicated with two fewer bits of data (because there are fewer of them). This is schematically indicated in FIG. 4 which schematically shows a table of the number of bits needed to uniquely identify a narrowband channel for different system bandwidths for both eMTC type narrowband channels (6 PRB wide) and fe-MTC type narrowband channels (24 PRB wide). In each case the required number of bits corresponds with ceiling[(log$_2$(BW$_s$/BW$_{NB}$)], where BW$_s$ corresponds with the system bandwidth measured in PRB and BW$_{NB}$ corresponds with the narrowband bandwidth measured in PRB (i.e. BW$_{NB}$ is 6 or 24 for eMTC and fe-MTC respectively).

Because identifying the specific narrowband in a given system bandwidth requires two fewer bits, a scheme for identifying allocated resource blocks within a wider bandwidth narrowband channel which requires 7 bits would mean there is no increase in the overall total number of bits needed to allocate resources for a fe-MTC narrowband channel (e.g. a 5 MHz channel) as compared to a eMTC narrowband channel (e.g. a 1.4 MHz). However, even if the restriction to only allow contiguous resource allocations of individual PRBs was maintained (i.e. no frequency diversity) for wider bandwidth narrowband operation, there would be 300 possible contiguous allocations for a 24 PRB channel (i.e. 1+2+3+ . . . +24=300), which would require 9 bits to indicate, thereby representing an increase in the number of DCI bits needed for allocation signalling.

To help address this in accordance with certain embodiments of the disclosure it is proposed to introduce restrictions to the PRB allocations that can be indicated where such restrictions allow for distributed/non-contiguous PRB allocations. The restriction(s) would reduce the number of bits required and various different ways of applying such restrictions are described below.

Some approaches may be based on what might be referred to as a multi-level/hierarchical indication approach. For example, in a three level approach, some data bits may indicate which one of the narrowbands within the system bandwidth the allocation applies to (first level indication), some data bits may indicate which one or more of the notional sub-narrowbands in the relevant narrowband the allocation applies to (second level indication), and some data bits may indicate which PRBs are allocated in the relevant sub-narrowband(s) (third level indication).

It will be appreciated that configuring allocations on a per 6PRB sub-narrowband basis in this way may facilitate backwards compatibility with an existing 3GPP Release 13 eMTC base station scheduler/scheduling circuitry which is designed for scheduling allocations in 6 PRB narrowbands (e.g. a 3GPP Release 13 eMTC scheduler could multiplex 3GPP Release 14 WB-MTC feMTC UEs and 3GPP Release13 eMTC UEs relatively easily in the same 6PRB band). Furthermore, by introducing a 2nd level to indicate the sub-narrowband(s) to which an allocation applies, a distributed resource allocation can be made, for example by allocating resources in non-adjacent sub-narrowbands. An example of this is schematically indicated in FIG. 5, which schematically shows the four sub-narrowbands (sub-NB #0, sub-NB #1, sub-NB #2 and sub-NB #3) for a single one of the 24 PRB narrowbands of FIG. 3. In this example it is assumed PRBs in the top and bottom sub-narrowbands (Sub-NB #0 and Sub-NB #3) may be allocated to a particular terminal device (as indicated by these sub-bands being shaded) to provide a level of frequency diversity for that terminal device. In this regard, it will be appreciated the reason why scheduling circuitry in the base station may determine that a particular terminal device may benefit from frequency diversity is not significant to the principles described herein, and in that regard the scheduling decisions may be made in accordance with conventional techniques, subject to the additional restrictions on which allocations can be made, as discussed herein.

The number of bits required to indicate the specific narrowband within the system bandwidth will, as discussed above, depend on the number of narrowbands that fit into/are supported on the system bandwidth (i.e. number of bits for the level 1 indication is ceiling[($\log_2(BW_s/BW_{NB})$)], where $BW_s$ corresponds with the system bandwidth and $BW_{NB}$ is the narrowband bandwidth. Thus, for the example of a 10 MHz channel supporting two 5 MHz narrowband channels, a single bit can be used to indicate which one of these is allocated, e.g. a value of 1 may indicate the higher frequency narrowband is allocated and a value of zero may indicate the lower frequency narrowband is allocated.

The number of bits used to indicate which one or more of the four sub-narrowbands that contain PRB allocations in this example is four bits, thereby allowing PRBs in any combination of the sub-narrowband to be allocated. For example, with reference to FIG. 5, a bit string 1001 may be used to indicate the first (Sub-NB #0) and fourth (Sub-NB #3) sub-narrowbands contain resource allocations for the terminal device. It will be appreciated the considerations herein mainly focus on the number of bits needed to provide the indication of the allocated resources, and not the specific protocol for doing this, e.g. whether in a specific implementations a one or a zero corresponds with an allocation or a non-allocation, or the order in which the bits are presented for the different sub-narrowbands, is of course not significant.

Thus, in accordance with this example, the number of bits required to identify which specific sub-narrowbands contain resource allocations for a terminal device in a system supporting two narrowbands which are notionally divided into four sub-narrowbands is five bits. This allows for allocations in any selected combination of the sub-narrowbands in a selected one of the narrowbands.

The number of bits required to indicate the specific PRBs in the allocated sub-narrowbands will depend on the manner in which these PRBs may be allocated. For example, in a simple case, it may be that all PRBs in an allocated sub-narrowband are always allocated to the terminal device. This reduces flexibility because resource allocations are in effect made in units of 6 PRBs, but this means no further data bits are required for the third level indication. This may be useful, for example, for relatively high throughput communications for which the restriction to allocating resources in units of 6 PRB may not cause any notable inefficiencies. Accordingly, a terminal device may receive an indication of an allocation of all PRBs in the top and bottom sub-narrowbands represented in FIG. 5 (i.e. a frequency diverse/distributed allocation), or indeed within any other combination of sub-narrowbands, within one of the narrowbands of the system bandwidth represented in FIG. 3 using only five bits of DCI data.

In another example resources (PRBs) may be allocated in different ways in each of the sub-narrowbands. For example, a given implementations may be restricted to support allocations in units of half a sub-narrowband (as opposed to units of a complete sub-narrowband as in the example above). For example, resources for a given terminal device may be selectively allocated in each sub-narrowband as follows: (1) no PRBs are allocated in the sub-narrowband, (2) three PRBs are allocated (e.g. the three lowest frequency PRBs) in the sub-narrowband, (3) the other three PRBs are allocated (e.g. the three highest frequency PRBs) in the sub-narrowband, and (4) all PRBs are allocated in the sub-narrowband. Thus the allocation for each sub-narrowband requires two bits.

For example, with this approach a two bit string may be used to identify one of four possible states for each sub-narrowband whereby:

"00" indicates all PRBs in the sub-narrowband are used/allocated (i.e. 6 PRBs)

"01" indicates the top half in the sub-narrowband are used/allocated (i.e. 3 PRBs)

"10" indicates the bottom half in the sub-narrowband are used (i.e. 3 PRBs)

"11": indicates none of the PRBs in the sub-narrowband is used (i.e. sub-narrowband is not allocated—zero PRBs)

It will of course be appreciated that different mappings and different states may be adopted in given implementations. For example, in another example a two bit string may be used to identify one of four possible states for each sub-narrowband whereby:

"00" indicates all PRBs in the sub-narrowband are allocated (i.e. 6 PRBs)

"01" indicates PRB #1, PRB #2 and PRB #3 in the sub-narrowband are allocated (i.e. 3 PRBs)

"10" indicates PRB #0 and PRB #1 in the sub-narrowband are allocated (i.e. 2 PRBs)

"11": indicates none of the PRBs in the sub-narrowband is used (i.e. sub-narrowband is not allocated—zero PRBs) For a given implementation, it will be appreciated the predetermined mapping to apply may be defined by specification or may be indicated in signalling received from a base station, for example it may be signalled semi-statically to the UE through common system information signalling or UE-specific signalling via a unicast RRC message.

An approach based on indicating one of four different states for each sub-narrowband requires four more bits than the above-described approach which allows only two states (all PRBs allocated or no PRBs allocated) for each sub-narrowband (i.e. 9 bits versus 5 bits for a system bandwidth comprising two narrowbands), but provides more scheduling flexibility.

In accordance with some other implementations a compromise may be made between increasing flexibility in allocations and reducing the number of bits required to convey an indication of the allocations to a terminal device. This may be done by allowing for several different combinations of PRBs within a sub-narrowband to be allocated, but requiring the allocation (or a related/derivable allocation) to apply to more than one sub-narrowband. That is to say, the allocations of PRBs in multiple sub-narrowband may be determined from data bits conveying a single selection of PRBs from 6 PRBs which is used to provide an indication of allocated PRBs on multiple sub-narrowbands. For example, the same or related (e.g. inverse or mirrored) allocations may be applied to different sub-narrowbands. In some respects this may be referred to as a repeated allocation in that the allocation of PRBs in one sub-narrowband is related to/derivable from the allocation of PRBs in another sub-narrowband according to a predefined relationship.

For example, and again in an example implementation comprising a system bandwidth spanning two narrowbands with each narrowband notionally divided into four sub-narrowbands, one bit may be used to indicate the relevant narrowband within the system bandwidth, four bits may be used to indicate which of the sub-narrowbands in the relevant narrowband contain PRB allocations, and a number of other bits may be used to indicate the specific PRB allocations to be used in each allocated sub-narrowband, the actual number of other bits being selected according to the desired degree of flexibility (i.e. the number of allowable combinations of PRB allocations in each sub-narrowband). For example, in one implementation five bits may be used to indicate specific PRB allocations within each allocated sub-narrowband by applying the currently-used contiguous PRB restriction within each sub-narrowband, which in this case still allows for frequency diversity by allocating resources in multiple sub-narrowbands.

An example of this approach is schematically represented in FIG. 6. This is similar to FIG. 5, but further represents the individual PRBs is in each of the four sub-narrowbands with the PRBs which are shaded considered to be allocated. As already noted, it will be appreciated this particular allocation is merely one specific example resource allocation for a particular terminal device that is used here for the purposes of explanation, and the reason why this particular allocation has been selected as appropriate for the terminal device is not significant and may be based on conventional principles, for example taking account of the number of PRBs that need to be allocated to support communications with the terminal device and the degree of frequency diversity that is desired, for example having regard to measurements of channel conditions in accordance with established techniques.

Thus, in the example of FIG. 6, the allocation message for indicating the resource allocation comprises:

(i) first level: one bit to indicate which of the two narrowbands contain the allocation (the narrowband not containing the allocation is not represented in FIG. 6), (ii) second level: four bits to indicate which of the notional sub-narrowbands contain allocated PRBs, in this example the four bits are 1010 to indicate the allocations apply to sub-narrowbands #0 and #3 (as already noted, the specific mapping between individual indication bits and individual sub-narrowbands used for a given implementations is not significant to the principles described herein); and (iii) third level: five bits to indicate which set of continuous PRBs are allocated in each of the sub-narrowband (e.g. using the existing 3GPP Release 13 method for a contiguous resource allocations within a 6 PRB narrowband).

In a variation of the approach represented in FIG. 6, the specific PRB allocations in different sub-narrowbands may be derived from the third level indication bits in different ways. For example, PRB allocations in the upper half of the narrowband channel represented in FIG. 5 (i.e. in the top two sub-narrowbands, Sub-NB #0 and Sub-NB #1) may be derived from the third level indication bits in one way (e.g. based on the existing scheme for allocating contiguous PRBs within a 3GPP Release 13 eMTC 6 PRB narrowband), and the PRB allocations in the lower half of the narrowband channel represented in FIG. 5 (i.e. in the bottom two sub-narrowbands, Sub-NB #2 and Sub-NB #3) may be derived from the third level indication bits in a different way, e.g. to provide a mirrored (in frequency) allocation or inverted allocation or staggered (offset) allocation compared to that used in the upper two sub-narrowbands.

For example if a UE is allocated on sub-narrowbands Sub-NB #0 and Sub-NB #3, and the contiguous set of PRBs indicated by the third level data bits identify allocations on PRB0 and PRB1, then this may be taken to correspond as an allocation of:

In sub-narrowband SB-NB #0, the UE is allocated with PRB0 and PRB1 (i.e. the top two PRBs in the top sub-narrowband in FIG. 6)

In sub-narrowband SB-NB #3, the UE is allocated with PRB4 and PRB5 (i.e. the bottom two PRBs in the bottom sub-narrowband in FIG. 6)

This approach allows for increased frequency diversity, e.g. by allowing for a UE to be allocated PRBs at opposite ends of the WB-NB channel.

In another example, the second level data bits may indicate the number of sub-narrowbands that are allocated and have the same or mirrored (or other derivably related, e.g. inverted or offset) allocation as indicated in the third level data bits. A predefined lookup table, e.g. established by specification, defining multiple potential configurations that may be configured for use by the eNB, e.g. using RRC configuration signalling, may then indicate which of the sub-narrowbands contain allocations for given second level indication data bit(s). An example is shown in the Table 2 of FIG. 7. Here, for each potential configuration, there are four possible combinations of sub-narrowband allocations that may be made, requiring two bits to indicate. For each configuration there is one combination of one sub-narrowband (e.g. which may be indicated by data bits "00"), one combination of two sub-narrowbands (e.g. which may be indicated by data bits "01"), one combination of three sub-narrowbands (e.g. which may be indicated by data bits "10"), and a combination of all four sub-narrowband (e.g. which may be indicated by data bits "11"). The specific sub-narrowbands in each combination is different for the different configurations (except, of course, for the combination of all sub-narrowbands), as represented in FIG. 7.

Thus in an example based on this approach, an eNB can configure a UE to use Configuration 1 or Configuration 2, e.g. in RRC configuration signalling. Two bits are used in the second level indicator to indicate the number of sub-narrowbands allocated within the selected WB-NB (i.e. 1, 2, 3 or 4), and which specific sub-narrowbands are allocated for the UE may be determined using this example lookup table. For example, if the UE is configured with Configuration 1 and two sub-narrowbands are indicated as being allocated by the two bits corresponding to the second level indicator, then it is determined Sub-NB #0 and Sub-NB #3 are allocated with the specific PRBs allocated in these sub-narrowbands indicated by the third level indicator, which may, for example be applied in accordance with the existing scheme for contiguous allocations within a 6 PRB channel. Thus the number of bits required in this case is:

1 bit for first level indication to indicate the WB-NB within the system bandwidth (this is based on the example used throughout that there are two WB-NB spanning the system bandwidth, but of course in another implementations there may be more narrowbands spanning the system bandwidth and so a correspondingly higher number of bits may be needed for indicating which specific narrowband channel contains an allocation).

2 bits for second level indication to indicate the number of sub-narrowbands and using a lookup table to find the sub-narrowband allocated.

5 bits for third level indication to indicate the contiguous PRBs allocated in the relevant sub-narrowbands.

It will be appreciated that different ways of indicating the PRBs within the allocated sub-narrowbands may be adopted and other approaches may not use the five-bit based indication of continuous PRB's corresponding to that currently used for 3GPP Release 13 eMTC operation on a 6 PRB channel, but may, for example, use a two bit indication indicating whether the upper half or lower half, or all PRBs in a sub-narrowband are allocated.

More generally, it will be appreciated that in all examples described herein, some specific allocations and mappings for determining allocations are described by way of example, but different rules on how specific allocations are derived from the data bits comprising the allocation information may vary from case to case (for example the specific sub-narrowbands corresponding with the entries in the table of FIG. 7 may be different in different implementations).

In some example embodiments, a restricted number of bits (e.g. 2 bits) may be used to indicate the number of sub-narrowbands that are allocated and the actual sub-narrowbands that have been allocated may be determined from the specific the PRB allocation indicated in the third level indication. For example, if the allocation signalling bits for a terminal device indicate resources are allocated on two sub-narrowbands, and the third level indication bit(s) indicate there is one PRB allocated within each sub-narrowband, the terminal device may determine the allocated sub-narrowbands are sub-NB #0 and sub-NB #3, which maximizes frequency diversity. However, if the allocation signalling bits for a terminal device indicate resources are allocated on two sub-narrowbands, and the third level indication bits indicates all PRBs are allocated within each sub-narrowband, the terminal device may determine the allocated sub-narrowbands are sub-NB #0 and sub-NB #1. The terminal device may determine this allocation is what was intended because if frequency diversity was required, the base station would have allocated three PRB in each of the four sub-narrowbands rather than six PRB in only two sub-narrowbands.

As noted above, it is known to allocate PRBs in units of resource block groups (RBG) that do not overlap in frequency space. In accordance with current proposals a RBG comprises two PRBs for a 5 MHz channel. It is this which gives rise to a requirement for 12 bits to uniquely identify all combinations of PRB allocations that could exist within a 24 PRB channel. One approach to reduce the number of bits needed to indicate an allocation would be to increase RBG from 2 PRB to 3 PRB, thereby reducing the number of bits needed to uniquely identify all combinations of PRB allocations that could exist within a 24 PRB channel to 8 bits.

To further reduce the number of bits required to allocate resources there may be further restrictions applied in respect of the combinations of RBG that may be allocated in a given wireless telecommunications system. For example, an allocation may be required to comprise only certain numbers of RBG, for example only "powers of two", i.e. 1, 2, 4 or 8 RBG for an RBG size of 3 PRB and a 24 PRB channel. This example gives rise to a total of 107 different RBG combinations (i.e. $C_1^8 + C_2^8 + C_4^8 + C_8^8$) that may be allocated, which require 7 bits to identify.

In another example an allocation can be selectively indicated as being distributed or contiguous (e.g. a base station may decide whether to provide a distributed or contiguous allocation based on whether it is determined to be better to take account of frequency diversity or localised good channel conditions, such a determination may be made in accordance with established principles of scheduling decisions). In this case a contiguous allocation may in fact be quasi-contiguous in that it may be allowed to wrap around the ends of the channel.

For example, in one implementation for a 24 PRB WB-NB channel divided into 8 RBG of size 3 PRB, the resource allocation bits may include:

a number of bits to indicate the relevant WB-NB within the system bandwidth (e.g. one bit if there are two WB-NB, or indeed zero bits if there is only one WB-NB that may be allocated)

1 bit to indicate whether the allocation is distributed or contiguous 3 bits to indicate the number of RBGs allocated 3 bits to indicate a starting RBG position Hence 7 bits in addition to the number of bits required to indicate the WB-NB are used, which does not lead to an increase over the 3GPP Release 13 DCI size.

FIG. 8 schematically represents a quasi-contiguous allocation using this approach while FIG. 9 schematically represents a distributed allocation using this approach. FIG. 8 corresponds with a quasi-contiguous (i.e. allowing wrapping) allocation of four RBG starting from RBG #5. Thus the allocated RBG are RBG #5, RBG #6, RBG #7 and RBG #0 (due to wrap around). FIG. 9 corresponds with a distributed allocation (which may also allow wrapping) of four RBG starting from RBG #1. Thus the allocated RBG are RBG #1, RBG #3, RBG #5 and RBG #7. As noted above, for a given starting point and number of RBG, a separate DCI bit may be used to indicate whether the allocation is quasi-contiguous or distributed. It will be appreciated the spacing between allocated RBG in a distributed allocation may be selected in different ways in different implementations. In some cases there may always be a gap of one RBG regardless of how many RBG are allocated, in other cases the size of the gaps may be determined according to the number of RBG allocated. The particular arrangement in a given case may be based on a predefined lookup table that specifies how to distribute a given number of RBG across the narrowband, for example.

In another implementation some aspects of the above-described examples may be combined. For example, in an approach which is similar to that using an indication of a number of RBG from an indicted starting point, the number of RBGs that can be allocated may be restricted, e.g. to power of 2s, i.e. 1, 2, 4 & 8 RBGs as discussed above, so that only 2 bits are needed to indicate the number of RBG.

In another embodiment, the DCI allocation message may indicate the number of RBGs that are allocated and also which sub-narrowbands contain these RBGs. A set of pre-defined rules or a look-up table may then be applied to define which RBGs in each sub-narrowband are being allocated for the different numbers of RBGs, for example based on a table such as that represented in FIG. 10.

Other allocation mapping rules may be adopted in other implementations. For example, in some cases all sub-narrowbands which are indicated as containing an allocation may be assigned RBGs in their lowest PRBs In some implementations, if the indicted number of allocated RBGs is greater than the number of active sub-NBs, additional RBGs may be assigned to the highest PRBs of each sub-narrowband in the order of the active sub-NBs (i.e. sub-NB #0 has an extra RBG added to it before sub-NB #1 etc.)

In order to facilitate multiplexing, these schemes may be modified by including an additional bit in the third level indicator field to indicate how the active sub-NBs should have RBGs assigned to them. E.g. if the extra bit is set to "0", this may be taken as an indication to derive the allocation by filling sub-narrowbands indicated as containing allocations (active sub-NBs) with RBGs from the lowest PRB in the active sub-narrowband. On the other hand, if the extra bit is set to "1", this may be taken as an indication to derive the allocation by filling the active sub-NBs with RBGs from the highest PRB in the active sub-NB.

With this approach it is possible, for example, to allocate two UEs with active sub-NB set {0,3} and 2 RBGs as follows:

UE_A is given a second level indication of active sub-NBs {0,3}, and a third level indication of {2 RBGs, extra_bit='0'}. Hence UE_A is allocated with:
PRBs 0,1,2 in sub-NB #0 and PRBs 0,1,2 in sub-NB #3
UE_B is given a second level indication of active sub-NBs {0,3}, and a third level indication of {2 RBGs, extra_bit='1'} Hence UE_B is allocated with:
PRBs 3,4,5 in sub-NB #0 and PRBs 3,4,5 in sub-NB #3

Hence with this approach two UEs may be scheduled in the same set of active sub-NBs with the same number of RBGs.

Figure 11:
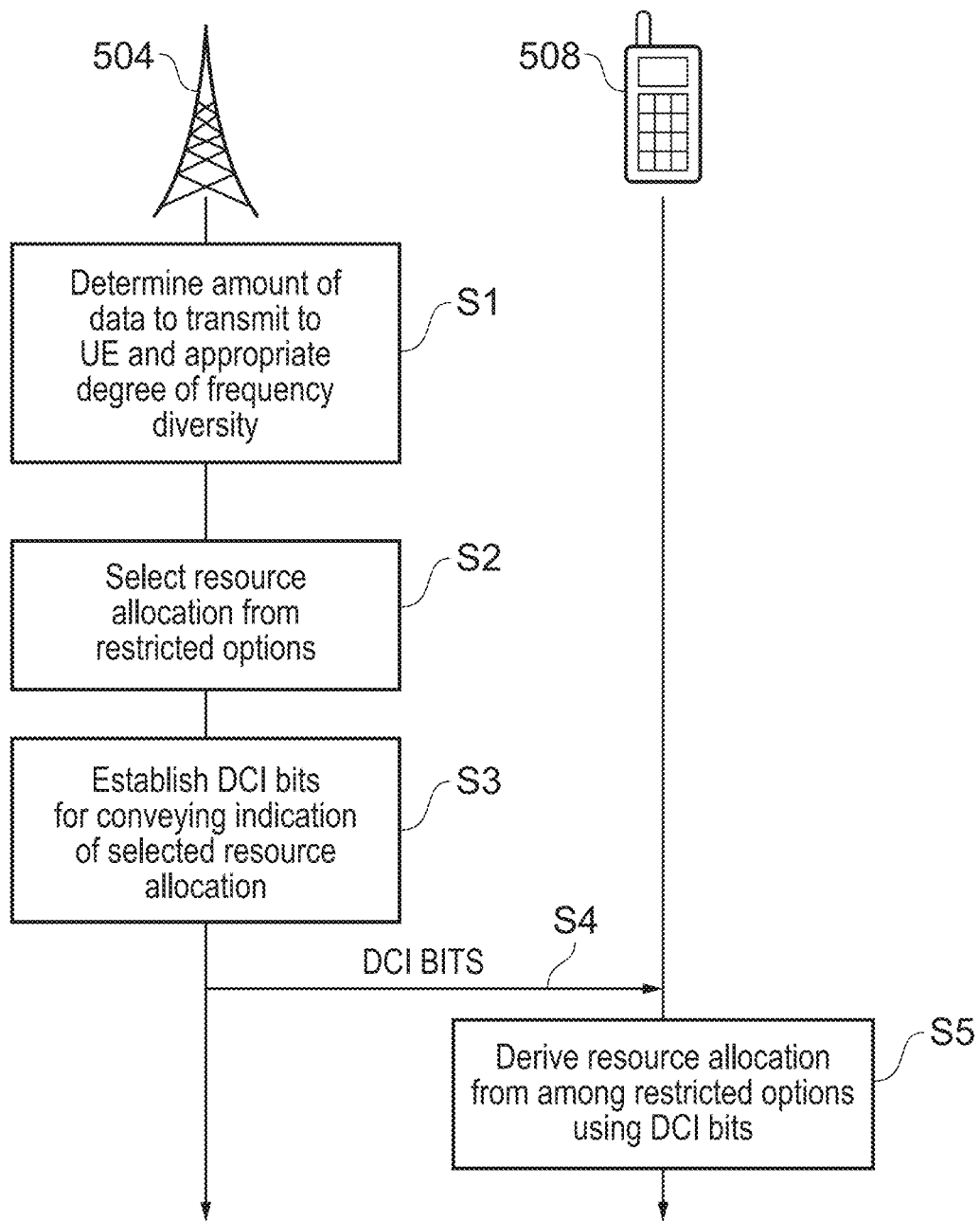
FIG. 11 is a ladder diagram representing some aspects of operation in a wireless telecommunications system in accordance with certain embodiments of the present disclosure.

FIG. 11 is a ladder diagram schematically showing steps of a downlink resource allocation procedure in which the base station 504 of FIG. 2 (left-hand node in FIG. 11) allocates radio resources for the terminal device 508 of FIG. 2 (right-hand node in FIG. 11) in accordance with certain embodiments of the disclosure. As already mentioned, it will be appreciated aspects of this operation which are not specifically described herein, for example the particular signalling protocols adopted, may be implemented in accordance with conventional techniques for communicating data in wireless telecommunications systems.

Thus, in step S1 the base station, using its processor circuitry 504b, determines that it has a particular amount of data to transmit to the terminal device and wishes to transmit this with a particular degree of frequency diversity. The content of the data to be communicated is, of course, not significant to the principles described herein. Furthermore, the manner in which the particular amount of data to be transmitted is determined and the particular degree of diversity which is desired may be determined in accordance with generally conventional principles, for example based on measurements of channel conditions.

In step S2 the base station, using its processor circuitry 504b, selects an appropriate resource allocation for conveying the relevant amount of data with the desired degree of frequency diversity from among the restricted options available in accordance with the principles described herein.

In step S3, using its processor circuitry 504b, the base station establishes a data string (e.g. comprising a sequence of DCI bits) corresponding to, and to be used for providing an indication of, the selected resource allocation.

In step S4, using its transceiver circuitry 504a, the base station conveys an indication of the selected resource allocation to the terminal device 508 using the data string established in step S3, and this is received by the terminal device 508 using its transceiver circuitry 508a.

In step S5 the terminal device, using its processor circuitry 508b, derives the resource allocation from among the restricted options using the information received from the base station in step S4.

Although not shown in FIG. 11, downlink user-plane data may be communicated from the base station to the terminal device on the allocated resources in accordance with generally conventional techniques.

The specific examples discussed above have focussed on implementations based around a 10 MHz system bandwidth divided into two 24 PRB narrowbands, which are in turn sub-divided into four sub-narrowbands of 6PRB. However, it will be appreciated this represents merely one concrete example provided for the sake of explanation and other implementations may adopt different channel sizes. For example, a larger or smaller system bandwidth and/or larger or smaller narrowband bandwidths and/or larger or smaller sub-narrowband bandwidths.

It will further be appreciated the above-described schemes for restricting and deriving the ways in which distributed resource allocations may be made in a wireless telecommunications system are presented in terms of algorithmic schemes for defining the allowed allocations. However, in principle once the allowed allocations for a given implementation are established, for example taking account of the desired scheduling flexibility and range of frequency diversity provided and the number of bits needed to indicate a given allocation, a particular allocation may then be indicated using a predefined lookup table approach. That is to say, a terminal device receiving a string of bits indicating its resource allocation may instead of algorithmically deriving its allocation from these bits, instead refer to a lookup table that maps the bits received to a particular resource allocation. In that regard it may be appreciated in some implementations there may be no particular algorithmic relationship between the allocation indication bits and an allocation itself in terms of specific radio resources/PRBs being allocated. However, what remains significant is that the available allocations include non-contiguous allocations and the total number of available/allowed allocations is less than the total number of different combinations of resource blocks on the channel (i.e. some combinations of PRB are not allowed so as to reduce the number of bits used to indicate the allocations which are allowed).

Thus there has been described a method of conveying an allocation of radio resources on a radio channel for communicating data between a base station and a terminal device in a wireless telecommunications system, wherein the radio channel spans a channel frequency bandwidth divided into frequency resource units which may be selectively allocated for communicating data between the base station and the terminal device, and wherein the method comprises, at the base station, selecting a combination of resource units for communicating the data between the base station and the terminal device from among a predefined set of allowable combinations of resource units, wherein the allowable combinations of resource units include non-contiguous combinations of resource units and wherein the number of allowable combinations of resource units is smaller than the total number of combinations of resource units, and conveying, to the terminal device, an indication of the selected combination of resource units.

While certain example embodiments have been described in relation to particular example network architectures, it will be appreciated the same principles can be applied in respect of other network architectures, for example non-LTE based networks. Furthermore, while the approach has been described in the context of an implementation in which a base station is responsible for scheduling allocations (i.e. selecting an allocation of resource units (which may PRBs or RBGs) from the allowed combinations), in other implementations this function may be provided by different network infrastructure equipment.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of communicating an indication of an allocation of radio resources on a radio channel for communicating data between a network infrastructure equipment and a terminal device in a wireless telecommunications system, wherein the radio channel spans a channel frequency bandwidth divided into frequency resource units which may be selectively allocated for communicating data between the network infrastructure equipment and the terminal device, and wherein the method comprises, at the network infrastructure equipment, selecting a combination of resource units for communicating the data between the network infrastructure equipment and the terminal device from among a predefined set of allowable combinations of resource units, wherein the set of the allowable combinations of resource units is restricted to a number of allowable combinations of resource units that is smaller than the total number of possible combinations of resource units and which includes non-contiguous combinations of resource units, establishing an indication of the selected combination of resource units; and transmitting the indication of the selected combination of resource units to the terminal device.

Paragraph 2. The method paragraph 1, wherein the radio channel is one of a plurality of narrowband channels supported within a wider system bandwidth of the wireless telecommunications system, and wherein the indication of the selected combination of resource units includes an indication of which one of the plurality of narrowband channels contains the selected combination of resource units.

Paragraph 3. The method of paragraph 1 or 2, wherein the radio channel is notionally divided into a plurality of sub-channels, and wherein the indication of the selected combination of resource units comprises an indication of which one or more of the sub-channels contains resource units in the selected combination of resource units.

Paragraph 4. The method of paragraph 3, wherein the set of allowable combinations of resource units is restricted to combinations in which all or none of the resource units in each of the sub-channels are in the selected combination of resource units.

Paragraph 5. The method of paragraph 3, wherein the set of allowable combinations of resource units is restricted to combinations in which all, none or half of the resource units in each of the sub-channels are in the selected combination of resource units.

Paragraph 6. The method of any of paragraphs 3 to 5, wherein the set of allowable combinations of resource units is restricted to combinations for which the resource units in the selected combination of resource units are contiguous within each sub-channel.

Paragraph 7. The method of any of paragraphs 3 to 6, wherein the indication of the selected combination of resource units comprises an indication of which resource units in each of the sub-channels are in the selected combination of resource units.

Paragraph 8. The method of paragraph 7, wherein the indication of which one or more of the sub-channels contains resource units in the selected combination of resource units comprises an indication that more than one of the sub-channels contains resource units in the selected combination of resource units, and wherein the arrangement of resource units in the selected combination of resource units in a first one of the sub-channels is related to the arrangement of resource units in the selected combination of resource units in a second one of the sub-channels in accordance with a predefined relationship, such that the indication of which resource units in the first one of the sub-channels are in the selected combination of resource units also indicates which resource units in the second one of the sub-channels are in the selected combination of resource units.

Paragraph 9. The method of paragraph 8, wherein the predefined relationship comprises an identical arrangement relationship, a mirrored arrangement relationship, an inverse arrangement relationship, or an offset arrangement relationship.

Paragraph 10. The method of any of paragraphs 1 to 9, wherein the allowable combinations of resource units is restricted to combinations containing predefined numbers of resource units.

Paragraph 11. The method of paragraph 10, wherein the predefined numbers of resource units for the allowable combinations consist of numbers which are powers of two.

Paragraph 12. The method of any of paragraphs 1 to 11, wherein the indication of the selected combination of resource units comprises an indication of a number of resource units in the selected combination of resource units and a starting point in frequency for the number of resource units in the selected combination of resource units.

Paragraph 13. The method of paragraph 12, wherein the indication of the selected combination of resource units further includes an indication of how the number of resource units in the selected combination of resource units are separated in frequency.

Paragraph 14. The method of any of paragraphs 1 to 13, wherein the step of establishing an indication of the selected combination of resource units is performed with reference to a lookup table mapping different combination of resource units that may be selected to different indications.

Paragraph 15. The method of any of paragraphs 1 to 14, wherein the channel frequency bandwidth is less than or equal to 5 MHz and each resource unit corresponds with a physical resource block, PRB, for the wireless telecommunications system.

Paragraph 16. The method of any of paragraphs 1 to 15, wherein the channel frequency bandwidth is less than or equal to 5 MHz and each resource unit corresponds with a resource block group, RBG, comprising three or more physical resource blocks, PRBs, for the wireless telecommunications system.

Paragraph 17. The method of any of paragraphs 1 to 16, wherein the indication of the selected combination of resource units for the terminal device is also associated with one or more other allowable combinations of resource units, and wherein the terminal device is associated with a predefined configuration setting to indicate which of the combinations of resource units associated with the indication is the selected combination of resource units for the terminal device.

Paragraph 18. The method of any of paragraphs 1 to 17, wherein the number of allowable combinations of resource units divided by the total number of combinations of resource units is less than or equal to a ratio selected from the group comprising: ½, ¼, ⅛, 1/16 and 1/32.

Paragraph 19. The method of any of paragraphs 1 to 18, wherein the channel frequency bandwidth for the radio channel comprises 24 physical resource blocks, PRBs, for the wireless telecommunications system.

Paragraph 20. Network infrastructure equipment for use in a wireless telecommunications system for communicating an indication of an allocation of radio resources on a radio channel for communicating data between the network infrastructure equipment and a terminal device, wherein the radio channel spans a channel frequency bandwidth divided into frequency resource units which may be selectively allocated for communicating data between the network infrastructure equipment and the terminal device, wherein the network infrastructure equipment comprises controller circuitry and transceiver circuitry configured to operate together such that the network infrastructure equipment is operable to: select a combination of resource units for communicating the data between the network infrastructure equipment and the terminal device from among a predefined set of allowable combinations of resource units, wherein the set of the allowable combinations of resource units is restricted to a number of allowable combinations of resource units that is smaller than the total number of possible combinations of resource units and which includes non-contiguous combinations of resource units, establish an indication of the selected combination of resource units; and transmit the indication of the selected combination of resource units to the terminal device.

Paragraph 21. Circuitry for network infrastructure equipment for use in a wireless telecommunications system for communicating an indication of an allocation of radio resources on a radio channel for communicating data between the network infrastructure equipment and a terminal device, wherein the radio channel spans a channel frequency bandwidth divided into frequency resource units which may be selectively allocated for communicating data between the network infrastructure equipment and the terminal device, wherein the circuitry comprises controller circuitry and transceiver circuitry configured to operate together such that the circuitry is operable to: select a combination of resource units for communicating the data between the network infrastructure equipment and the terminal device from among a predefined set of allowable combinations of resource units, wherein the set of the allowable combinations of resource units is restricted to a number of allowable combinations of resource units that is smaller than the total number of possible combinations of resource units and which includes non-contiguous combinations of resource units, establish an indication of the selected combination of resource units; and transmit the indication of the selected combination of resource units to the terminal device.

Paragraph 22. A method of communicating an indication of an allocation of radio resources on a radio channel for communicating data between a network infrastructure equipment and a terminal device in a wireless telecommunications system, wherein the radio channel spans a channel frequency bandwidth divided into frequency resource units which may be selectively allocated for communicating data between the network infrastructure equipment and the terminal device, and wherein the method comprises, at the terminal device, receiving an indication of a selected combination of resource units from the network infrastructure equipment; and establishing from the indication of the selected combination of resource units which one of a set of allowable combinations of resource units is the selected combination of resource units, wherein the set of the allowable combinations of resource units is restricted to a number of allowable combinations of resource units that is smaller than the total number of possible combinations of resource units and which includes non-contiguous combinations of resource units.

Paragraph 23. A terminal device for use in a wireless telecommunications system for communicating an indication of an allocation of radio resources on a radio channel for communicating data between a network infrastructure equipment and the terminal device, wherein the radio channel spans a channel frequency bandwidth divided into frequency resource units which may be selectively allocated for communicating data between the network infrastructure equipment and the terminal device, wherein the terminal device comprises controller circuitry and transceiver circuitry configured to operate together such that the terminal device is operable to: receive an indication of a selected combination of resource units from the network infrastructure equipment; and establish from the indication of the selected combination of resource units which one of a set of allowable combinations of resource units is the selected combination of resource units, wherein the set of the allowable combinations of resource units is restricted to a number of allowable combinations of resource units that is smaller than the total number of possible combinations of resource units and which includes non-contiguous combinations of resource units.

Paragraph 24. Circuitry for a terminal device for use in a wireless telecommunications system for communicating an indication of an allocation of radio resources on a radio channel for communicating data between a network infrastructure equipment and the terminal device, wherein the radio channel spans a channel frequency bandwidth divided into frequency resource units which may be selectively allocated for communicating data between the network infrastructure equipment and the terminal device, wherein the circuitry comprises controller circuitry and transceiver circuitry configured to operate together such that the circuitry is operable to: receive an indication of a selected combination of resource units from the network infrastructure equipment; and establish from the indication of the selected combination of resource units which one of a set of allowable combinations of resource units is the selected combination of resource units, wherein the set of the allowable combinations of resource units is restricted to a number of allowable combinations of resource units that is smaller than the total number of possible combinations of resource units and which includes non-contiguous combinations of resource units.

REFERENCES

[1] ETSI TS 122 368 V12.4.0 (2014-10)/3GPP TS 22.368 version 12.4.0 Release 12
[2] Holma H. and Toskala A, "LTE for UMTS OFDMA and SC-FDMA based radio access", John Wiley and Sons, 2009
[3] 3GPP document RP-161324, "New work item proposal: Enhancements of NB-IoT," Vodafone, Huawei, HiSilicon, Ericsson, Qualcomm, RAN #72
[4] 3GPP document RP-161321, "New WI proposal on Further Enhanced MTC", Ericsson, RAN #72
[5] 3GPP document TS 36.212 "E-UTRA: Multiplexing and channel coding (Release 13), 3GPP

What is claimed is:

1. Circuitry for network infrastructure equipment for use in a wireless telecommunications system for communicating an indication of an allocation of radio resources on a radio channel for communicating data between the network infrastructure equipment and a terminal device, wherein the radio channel spans a channel frequency bandwidth divided into frequency resource units which may be selectively allocated for communicating data between the network infrastructure equipment and the terminal device, wherein the circuitry comprises controller circuitry and transceiver circuitry configured to operate together such that the circuitry is operable to:
select a combination of resource units for communicating the data between the network infrastructure equipment and the terminal device from among a predefined set of allowable combinations of the resource units, wherein the set of the allowable combinations of the resource units includes non-contiguous combinations of the resource units,
establish an indication of the selected combination of the resource units; and
transmit the indication of the selected combination of the resource units to the terminal device, wherein
the radio channel is one of a plurality of narrowband channels supported within a wider system bandwidth of the wireless telecommunications system, and wherein the indication of the selected combination of the resource units includes an indication of which one of the plurality of narrowband channels contains the selected combination of the resource units, and
the indication of the selected combination of the resource units includes a first set of data bits indicating which one of the plurality of narrowband channels the allocation of radio resources applies to, a second set of data bits indicating which of one or more sub-channels the allocation of radio resources applies to, and a third set of data bits indicating which of the resource units are allocated in the one or more sub-channels.

2. The circuitry of claim 1, wherein the radio channel is notionally divided into a plurality of sub-channels, and wherein the indication of the selected combination of the resource units includes an indication of which one or more of the sub-channels contains resource units in the selected combination of the resource units.

3. The circuitry of claim 2, wherein the set of allowable combinations of the resource units is restricted to combinations in which all or none of the resource units in each of the sub-channels are in the selected combination of the resource units.

4. The circuitry of claim 2, wherein the set of allowable combinations of the resource units is restricted to combinations in which all, none or half of the resource units in each of the sub-channels are in the selected combination of the resource units.

5. The circuitry of claim 2, wherein the set of allowable combinations of the resource units is restricted to combinations for which the resource units in the selected combination of the resource units are contiguous within each sub-channel.

6. The circuitry of claim 2, wherein the indication of the selected combination of the resource units includes an indication of which resource units in each of the sub-channels are in the selected combination of the resource units.

7. The circuitry of claim 6, wherein the indication of which one or more of the sub-channels contains resource units in the selected combination of the resource units comprises an indication that more than one of the sub-channels contains resource units in the selected combination of the resource units, and wherein the arrangement of the resource units in the selected combination of the resource units in a first one of the sub-channels is related to the arrangement of the resource units in the selected combination of the resource units in a second one of the sub-channels in accordance with a predefined relationship, such that the indication of which resource units in the first one of the sub-channels are in the selected combination of the resource units also indicates which resource units in the second one of the sub-channels are in the selected combination of the resource units.

8. The circuitry of claim 7, wherein the predefined relationship comprises an identical arrangement relationship, a mirrored arrangement relationship, an inverse arrangement relationship, or an offset arrangement relationship.

9. A method of communicating an indication of an allocation of radio resources on a radio channel for communicating data between a network infrastructure equipment and a terminal device in a wireless telecommunications system, wherein the radio channel spans a channel frequency bandwidth divided into frequency resource units which may be selectively allocated for communicating data between the network infrastructure equipment and the terminal device, and wherein the method comprises, at the terminal device, receiving an indication of a selected combination of resource units from the network infrastructure equipment; and establishing from the indication of the selected combination of the resource units which one of a set of allowable combinations of the resource units is the selected combination of the resource units, wherein the set of the allowable combinations of the resource units includes non-contiguous combinations of the resource units, wherein the radio channel is one of a plurality of narrowband channels supported within a wider system bandwidth of the wireless telecommunications system, and wherein the indication of the selected combination of the resource units includes an indication of which one of the plurality of narrowband channels contains the selected combination of the resource units, and the indication of the selected combination of the resource units includes a first set of data bits indicating which one of the plurality of narrowband channels the allocation of radio resources applies to, a second set of data bits indicating which of one or more sub-channels the allocation of radio resources applies to, and a third set of data bits indicating which of the resource units are allocated in the one or more sub-channels.

10. Circuitry for a terminal device for use in a wireless telecommunications system for communicating an indication of an allocation of radio resources on a radio channel for communicating data between a network infrastructure equipment and the terminal device, wherein the radio channel spans a channel frequency bandwidth divided into frequency resource units which may be selectively allocated for communicating data between the network infrastructure equipment and the terminal device, wherein the circuitry comprises controller circuitry and transceiver circuitry configured to operate together such that the circuitry is operable to:

receive an indication of a selected combination of resource units from the network infrastructure equipment; and establish from the indication of the selected combination of resource units which one of a set of allowable combinations of the resource units is the selected combination of the resource units, wherein the set of the allowable combinations of the resource units includes non-contiguous combinations of the resource units, wherein the radio channel is one of a plurality of narrowband channels supported within a wider system bandwidth of the wireless telecommunications system, and wherein the indication of the selected combination of the resource units includes an indication of which one of the plurality of narrowband channels contains the selected combination of the resource units, and the indication of the selected combination of the resource units includes a first set of data bits indicating which one of the plurality of narrowband channels the allocation of radio resources applies to, a second set of data bits indicating which of one or more sub-channels the allocation of radio resources applies to, and a third set of data bits indicating which of the resource units are allocated in the one or more sub-channels.

11. The circuitry of claim 10, wherein the radio channel is notionally divided into a plurality of sub-channels, and wherein the indication of the selected combination of the resource units includes an indication of which one or more of the sub-channels contains resource units in the selected combination of the resource units.

12. The circuitry of claim 11, wherein the set of allowable combinations of the resource units is restricted to combinations in which all or none of the resource units in each of the sub-channels are in the selected combination of the resource units.

13. The circuitry of claim 12, wherein the set of allowable combinations of the resource units is restricted to combinations in which all, none or half of the resource units in each of the sub-channels are in the selected combination of the resource units.

14. The circuitry of claim 12, wherein the set of allowable combinations of the resource units is restricted to combinations for which the resource units in the selected combination of the resource units are contiguous within each sub-channel.

15. The circuitry of claim 12, wherein the indication of the selected combination of the resource units includes an indication of which resource units in each of the sub-channels are in the selected combination of the resource units.

16. The circuitry of claim 15, wherein the indication of which one or more of the sub-channels contains resource units in the selected combination of the resource units comprises an indication that more than one of the sub-channels contains resource units in the selected combination of the resource units, and wherein the arrangement of the resource units in the selected combination of the resource units in a first one of the sub-channels is related to the arrangement of the resource units in the selected combination of the resource units in a second one of the sub-channels in accordance with a predefined relationship, such that the indication of which resource units in the first one of the sub-channels are in the selected combination of the resource units also indicates which resource units in the second one of the sub-channels are in the selected combination of the resource units.

17. The method of claim 9, further comprising notionally dividing the radio channel into a plurality of sub-channels, and wherein the indication of the selected combination of the resource units includes an indication of which one or more of the sub-channels contains resource units in the selected combination of the resource units.

18. The method of claim 17, further comprising restricting the set of allowable combinations of the resource units to combinations in which all or none of the resource units in each of the sub-channels are in the selected combination of the resource units.

19. The method of claim 18, wherein the indication of the selected combination of the resource units includes an indication of which resource units in each of the sub-channels are in the selected combination of the resource units.

20. The method of claim 19, wherein the indication of which one or more of the sub-channels contains resource units in the selected combination of the resource units comprises an indication that more than one of the sub-channels contains resource units in the selected combination of the resource units, and wherein the arrangement of the resource units in the selected combination of the resource units in a first one of the sub-channels is related to the arrangement of the resource units in the selected combination of the resource units in a second one of the sub-channels in accordance with a predefined relationship, such that the indication of which resource units in the first one of the sub-channels are in the selected combination of the resource units also indicates which resource units in the second one of the sub-channels are in the selected combination of the resource units.

\* \* \* \* \*